No. 759,613.

Patented May 10, 1904.

UNITED STATES PATENT OFFICE.

KARL JEDLICKA, OF BASLE, SWITZERLAND, ASSIGNOR TO THE FIRM OF SOCIETY OF CHEMICAL INDUSTRY IN BASLE, OF BASLE, SWITZERLAND.

VIOLET TETRAZO DYE AND PROCESS OF MAKING SAME.

SPECIFICATION forming part of Letters Patent No. 759,613, dated May 10, 1904.

Application filed January 7, 1904. Serial No. 188,126. (No specimens.)

*To all whom it may concern:*

Be it known that I, KARL JEDLICKA, chemist and doctor of philosophy, a citizen of the Swiss Republic, and a resident of Basle, Switzerland, have invented new and useful Improvements in the Manufacture of Tetrazo Dyestuffs, of which the following is a full, clear, and complete specification.

This invention relates to the manufacture of new tetrazo dyestuffs by the combination of one molecule of the tetrazo derivative of a paradiamin of the diphenyl series with two molecules of naphtholic compounds, of which one at least is the 2.5.1.7-amidonaphtholdisulfonic acid, ($NH_2:OH:SO_3H:SO_3H = 2:5:1:7$.)

The new dyestuffs correspond to the general formula:

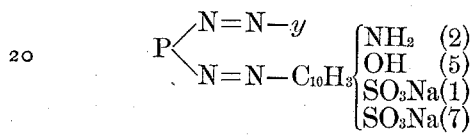

wherein P stands for the radical "diphenyl," "ditolyl," &c., and $y$ for a naphtholic compound—as, for instance, an amidonaphtholsulfonic acid, an amidonaphtholdisulfonic acid, an alphanaphtholsulfonic acid, a betanaphtholsulfonic acid, an oxynaphthoic acid, &c. These dyestuffs are in dry state dark powders with metallic luster. They dissolve in water with red-violet to blue coloration and dye cotton without mordant from violet to blue. They may be diazotised in substance or on the fiber and then be combined with developers. The greatest interest attaches to the tints obtained by development on the fiber with beta-naphthol, which are indigo-blue and very fast to washing, and with metatoluylenediamin, which are black and also very fast to washing.

The dyestuffs are best prepared by combining the components in a solution made alkaline with sodium carbonate, but may also be prepared in an acetic-acid solution, inasmuch as the products are the same whether combination occurs in acid or alkaline solution.

The invention is illustrated by the following examples.

Example I: 18.4 kilos of benzidin are dissolved in about five hundred liters of water containing sixty kilos of hydrochloric acid of thirty-per-cent. strength and are tetrazotised with fourteen kilos of sodium nitrite while cooling by ice. The solution of tetrazodiphenyl thus obtained is poured into a cooled solution of sixty-four kilos of 2.5.1.7-amidonaphtholdisulfonic acid in water containing an excess of sodium carbonate, care being taken to stir during some hours. The whole is then heated to about 80° centigrade, and the dyestuff is precipitated by adding common salt. This dyestuff corresponds to the formula

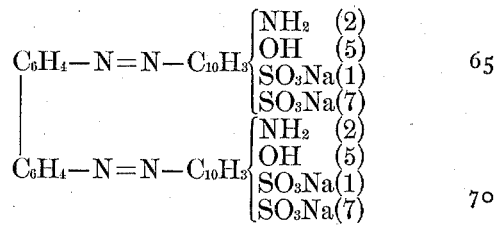

It represents in dry state a dark powder of bronze luster, which dissolves in water with a violet coloration and is insoluble in alcohol. In concentrated sulfuric acid of 66° Baumé it dissolves with a blue coloration. It dyes cotton without a mordant clear violet tints, which become indigo-blue, fast to washing by diazotisation on the fiber and development with beta naphthol. Analogous dyestuffs are obtained when in this example the benzidin is replaced by tolidin, dianisidin, ethoxybenzidin, dichlorobenzidin, paradiamidodiphenylamin, &c.

Example II: 21.2 kilos of tolidin are dissolved in about five hundred liters of water containing sixty kilos of hydrochloric acid of thirty-per-cent. strength and are tetrazotised by means of fourteen kilos of sodium nitrite while cooling by ice. The solution of tetrazoditolyl obtained is then poured into a cooled solution of thirty-two kilos of 2.5.1.7-amidonaphtholdisulfonic acid containing an excess of sodium carbonate, care being taken to stir. When the intermediate product has formed, there is poured in a neutral solution of twenty-five kilos of 1.4-naphtholsulfonic acid and the mass is stirred during some hours. The whole is then heated to about 80° centigrade and the dyestuff is precipitated by adding common salt. It constitutes in dry state a dark powder of bronze luster, easily soluble in water with a violet coloration, but scarcely soluble in hot alcohol. Its solution in concentrated sulfuric acid has a blue coloration. It dyes unmordanted cotton clear blue tints, which on diazotisation on the fiber and development with beta-naphthol are transformed into indigo-blue shades. In this example the tolidin may be replaced by benzidin, dianisidin, ethoxybenzidin, dichlorobenzidin, paradiamidodiphenylamin, &c., and instead of 1.4-naphtholsulfonic acid another naphtholsulfonic acid, an amidonaphtholsulfonic acid, an oxynaphthoic acid, &c., may be employed.

What I claim is—

1. The herein-described process for the manufacture of tetrazo dyestuffs, which consists in combining one molecule of the tetrazo derivative of a paradiamin of the diphenyl series with two molecules of naphtholic compounds, of which one at least is the 2.5.1.7-amidonaphtholdisulfonic acid.

2. The herein-described process for the manufacture of tetrazo dyestuffs, which consists in combining one molecule of the tetrazo derivative of a paradiamin of the diphenyl series with two molecules of 2.5.1.7-amidonaphtholdisulfonic acid.

3. As new products the tetrazo dyestuffs of the general formula

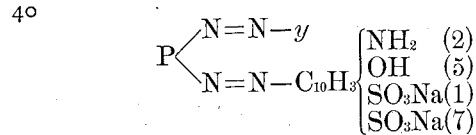

(wherein P stands for the radical of a paradiamin of the diphenyl series and $y$ for a naphtholic compound), which are in dry state dark powders with metallic luster, soluble in water with red violet to blue color, dye unmordanted cotton from violet to blue shades, which by further diazotisation on the fiber and development with beta-naphthol are transformed into indigo-blue tints fast to washing.

4. As new products the tetrazo dyestuffs corresponding to the formula

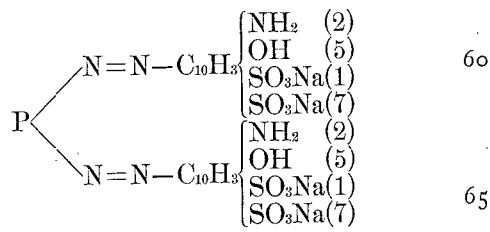

(wherein P stands for the radical of a paradiamin of the diphenyl series), which are, in dry state, dark powders of metallic luster, easily soluble in water with violet color, dyeing unmordanted cotton violet shades which, by further diazotisation of the fiber and development with beta-naphthol, are transformed into indigo-blue tints fast to washing.

5. As a new article of manufacture, the herein-described violet tetrazo dyestuff corresponding to the formula

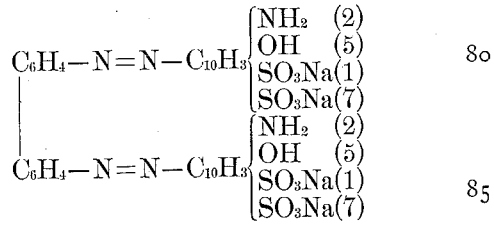

which constitutes in dry state of dark powder of bronze luster, soluble in water with violet color, insoluble in hot alcohol, soluble in concentrated sulfuric acid with a blue coloration, dyeing unmordanted cotton violet shades, which by further diazotisation on the fiber and development with beta-naphthol can be transformed into indigo-blue tints fast to washing.

In witness whereof I have hereunto signed my name, this 19th day of December, 1903, in the presence of two subscribing witnesses.

KARL JEDLICKA.

Witnesses:
 AMAND RITTER,
 ALBERT GEOETER.